United States Patent [19]

Pietropaoli

[11] Patent Number: 5,000,646
[45] Date of Patent: Mar. 19, 1991

[54] DEVICE TO FACILITATE THE LOADING OF LUGGAGES INTO AIRCRAFT HOLDS

[75] Inventor: Paolo Pietropaoli, Roma, Italy

[73] Assignee: Sefind S.R.L., Rome, Italy

[21] Appl. No.: 349,633

[22] Filed: May 10, 1989

[30] Foreign Application Priority Data

May 13, 1988 [IT] Italy ............... 47967 A/88

[51] Int. Cl.$^5$ .............................. B60P 1/64
[52] U.S. Cl. .................... 414/503; 414/398; 414/393; 414/523; 414/284; 244/137.1
[58] Field of Search ............ 414/525.1, 467, 539, 414/491, 522, 523, 679, 559, 390, 393, 398, 501, 502, 503, 504, 505, 507, 518, 284; 244/137.1

[56] References Cited

U.S. PATENT DOCUMENTS

| | | | |
|---|---|---|---|
| 1,499,530 | 7/1924 | Henderson | 414/498 |
| 2,268,009 | 12/1941 | Babb et al. | 244/137.1 X |
| 2,404,195 | 7/1946 | Schlieben | 244/137.1 |
| 3,356,236 | 12/1967 | Shaw et al. | 244/137.1 X |
| 3,853,230 | 12/1974 | Schultz | 414/679 X |
| 4,006,869 | 2/1977 | Vogele | 414/679 X |
| 4,050,655 | 9/1977 | Bogue et al. | 244/137.1 |
| 4,273,494 | 6/1981 | Swain et al. | 414/284 X |
| 4,395,181 | 7/1983 | Loomer | 414/284 |
| 4,718,810 | 1/1988 | Hoehn et al. | 414/222 X |

FOREIGN PATENT DOCUMENTS

| | | | |
|---|---|---|---|
| 88630 | 4/1987 | Japan | 414/284 |
| 157138 | 7/1987 | Japan | 414/398 |

*Primary Examiner*—Frank E. Werner
*Attorney, Agent, or Firm*—Roland T. Bryan

[57] ABSTRACT

A device to facilitate the luggages' loading into and the unloading out of aircraft holds consisting of a movable truck which is located in the aircraft hold and receives in succession from the conventional belt elevator the luggages or packages to be conveyed to the operators within the aircraft hold, whereupon the movable truck is returned to the starting point to receive another luggage and so on until the loading operation is completed. The luggages' unloading operation is performed in the reverse direction.

7 Claims, 4 Drawing Sheets

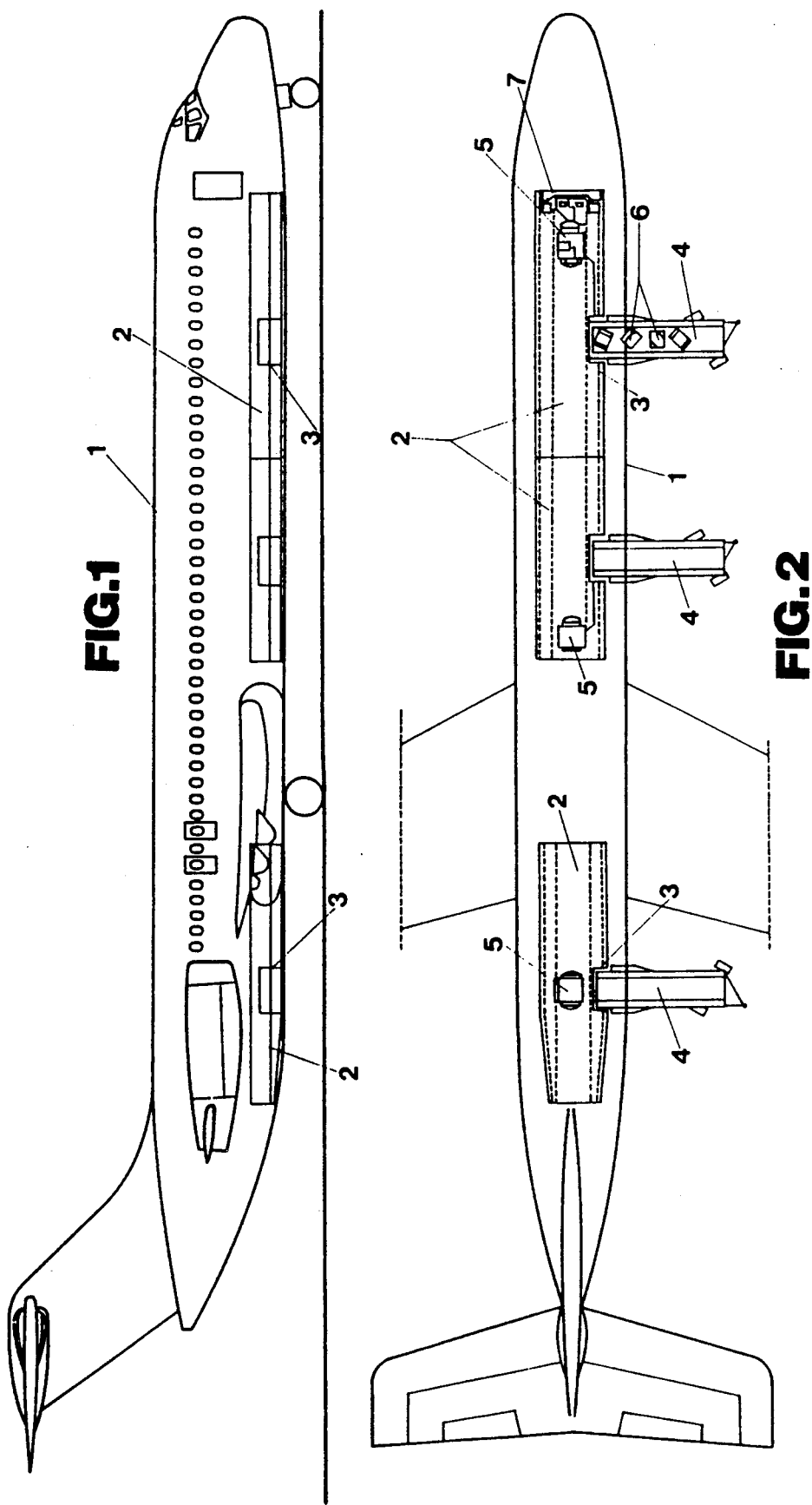

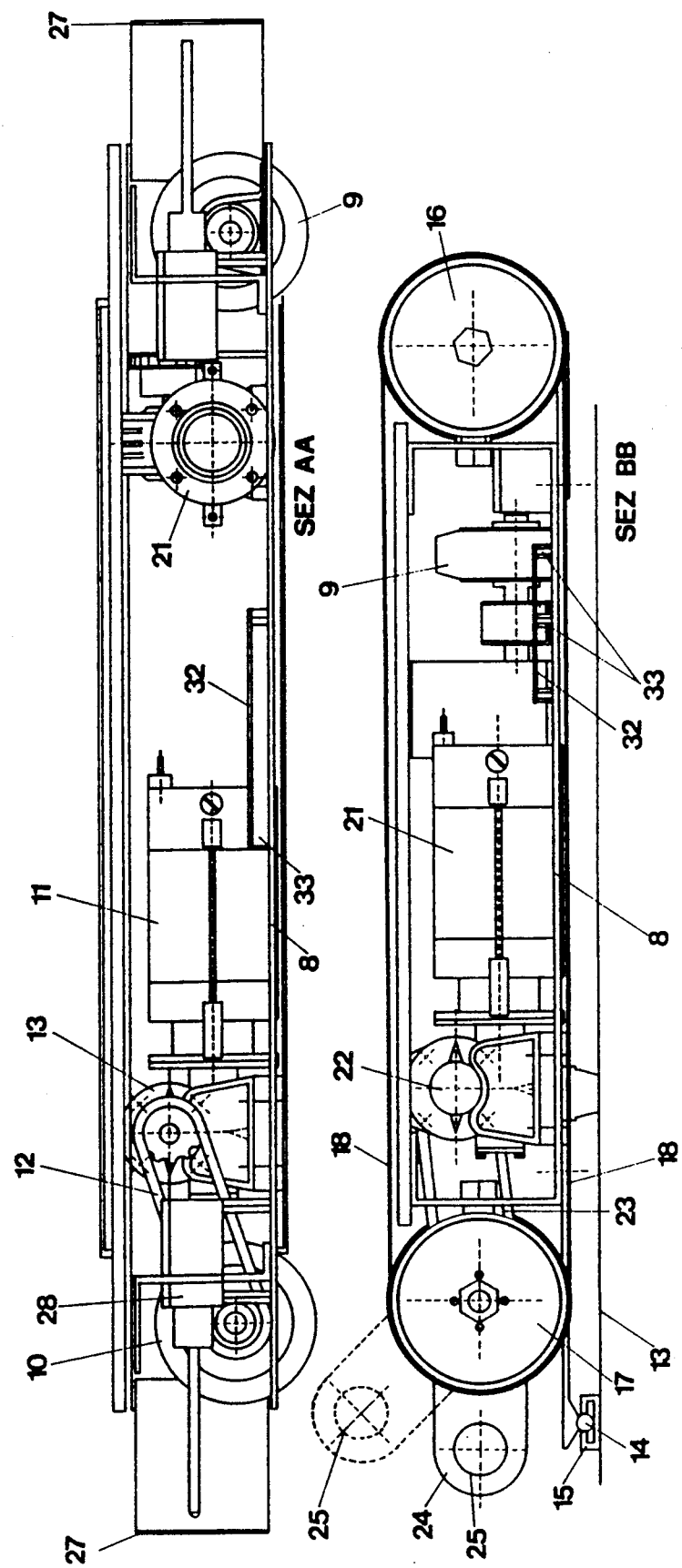

DEVICE TO FACILITATE THE LOADING OF LUGGAGES INTO AIRCRAFT HOLDS

This invention relates to a device to facilitate the loading and unloading of luggages for aircraft holds.

It is beyond doubt that among the ground facilities of an airport the lodging of luggages within the aircraft hold should not be disregarded in view of the efficiency and the quality of the service. The same should be said about the reverse operation, i.e. the unloading and sorting of luggages and/or goods at the end of the flight.

Presently such operations are carried out by means of a belt elevator carrying luggages in succession up to the aircraft hold door. Inside the hold, in an extremely inconvenient position due to the very limited height, two or more operators take up the luggages from the belt elevator and arrange them in the hold. This method implies several drawbacks such as the need for equalizing the operation speed of the operators to the speed of the belt elevator, the luggage's accumulation being consequently caused in addition to the chance of stopping the elevator itself and damaging the luggages, the latter being sometimes hurled from an operator to another.

In a recent patent application of the same inventor a device to facilitate the loading and unloading operation is described, said device consisting of a belt platform horizontally placed adjacent the conventional belt elevator in order to receive in succession from the latter the luggages to be stowed, said platform being connected through slideable telescopic members to a wheeled frame movable on the hold plane so that the platform carrying each luggage moves up to the operator within the hold and is driven by a roller mounted between the belt elevator and the belt platform.

However, it has been noticed that in some cases the introduction of the platform into the aircraft hold could be more quickly effected if the platform would be independent of the belt elevator, i.e. the continuity among belt elevator, transfer roller and wheeled frame would be no longer needed.

This invention seeks to provide a device which eliminates said drawbacks so that the loading and unloading operations for the aircraft holds are made rational, quick and convenient, and besides being absolutely reliable and not expensive does not need any modification to the aircraft and the ground facilities as well as assures above all that the operation within the hold cannot damage the aircraft.

According to the invention a device is provided which is comprised of a self-propelled truck to be located within an aircraft hold, which truck receives in succession the luggages or packages from the conventional belt elevator and carries them within the hold up to an operator providing for their stowing, whereupon the truck returns to the starting point and takes up another luggage and so on until the loading operation is completed.

Said truck is self-propelling as it is driven by electrical motors. It is operatively connected to the belt elevator such as to stop the latter during the luggage transfer stroke and to start it again at the end of the return stroke when the truck is facing the belt elevator according to the position of a rotary switch actuated by the tractive force of the power cable which can be extended during the luggage transfer stroke and is retracted during the return stroke as it is wound about a reel integral with the truck.

The shuttle movement of the truck is controlled by two bumpers mounted at the respective ends of the truck and causing the latter to be stopped as a consequence of the contact with the operator's legs and the feed direction to be reversed as a consequence of the taking up of the luggage from the truck.

According to the invention said self-propelling truck is guided in its sliding movement within the aircraft hold by means of a sliding shoe integral with the truck and inserted into a longitudinal guide mounted on the bottom of the hold. The sliding movement can be selectively effected to the left hand side or to the right hand side of the hold with respect to the door under control of the operator.

This invention will be now described with reference to the annexed drawing showing by way of an illustrative, non-limitative example of a preferred embodiment of the invention. In the drawing:

FIG. 1 shows schematically an elevation side view illustrating the arrangement of the loading holds of a jet-airliner;

FIG. 2 is the plan view corresponding to FIG. 1;

FIG. 4 is a section along the plane A—A of FIG. 3;

FIG. 5 is a section along the plane B—B of FIG. 3;

Figure 3:
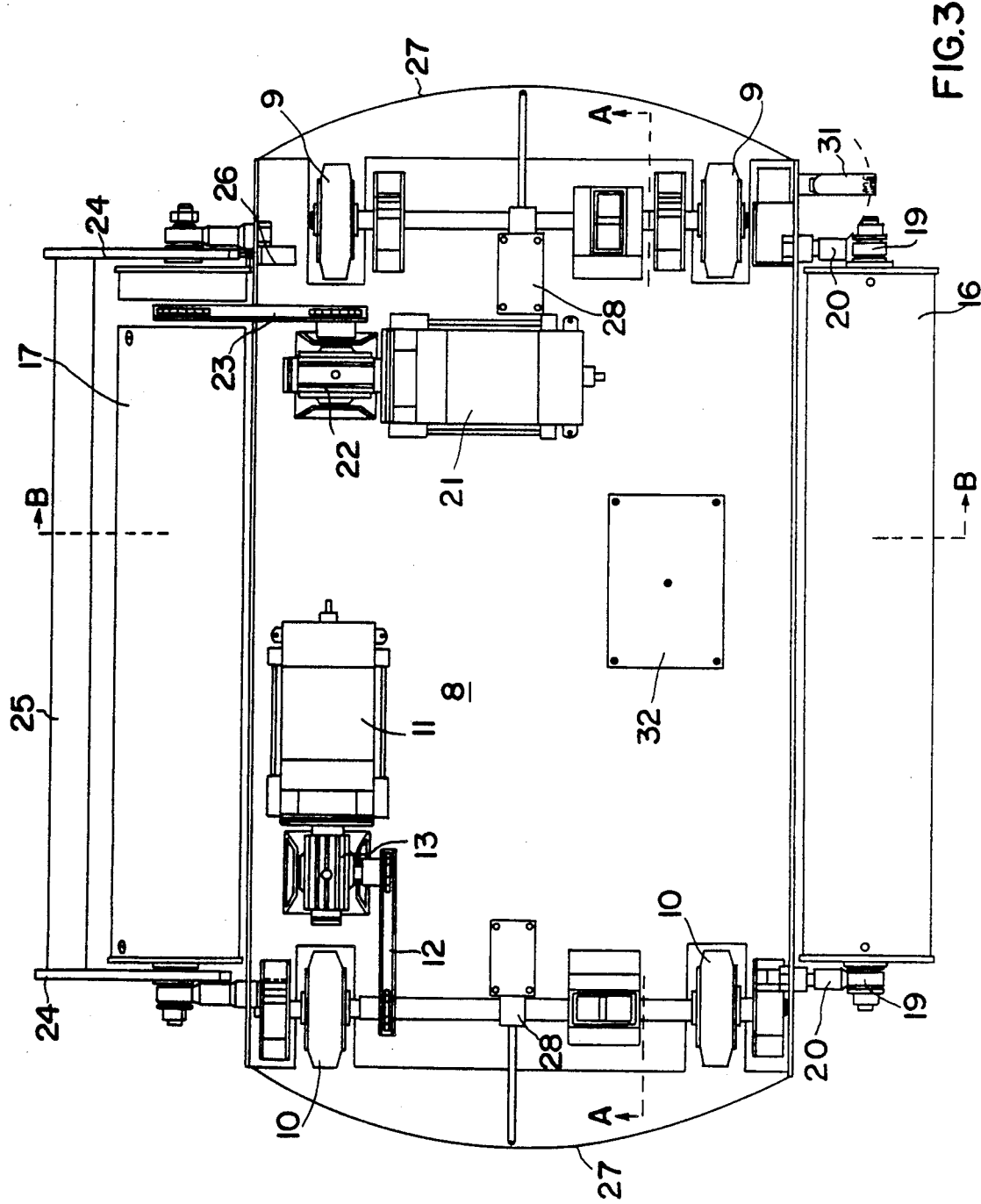
FIG. 3 shows the shuttle truck according to the invention in a plan view with some parts removed for the sake of clearness.

Referring to FIGS. 1 and 2 an aircraft generally designated by 1 is provided with several loading holds designated by 2. Aircraft 1 is by way of example of the type Douglas Super 80 used by major Airline Companies but it is self-evident that such a type is indicative only as the device according to the invention is applicable to any type of aircraft provided with a hold.

Loading holds 2 have an entrance opening 3 provided with a door (not shown) to which a belt elevator 4 of the conventional type is approached in order to lift in succession the luggages or packages up to the level of the hold. The invention provides a self-propelling truck 5 which is independent of belt elevator 4, however it is operatively associated thereto, which truck is portable and is manually brought into the hold (due to the low weight and the small size thereof) at the beginning of the loading or unloading operations and is brought away at the end of the same.

The self-propelling truck 5 in a starting position receives from belt elevator 4 the luggages 6 one at a time, and then moves within the hold until it reaches a storage position at operator 7. There it stops so that the operator can take up the luggage and stow it into the hold rack, thereafter it returns to the starting position to receive another luggage and so on until the loading is completed. It should be appreciated that during the reciprocating motion of the "shuttle" truck 5 the belt elevator 4 is stationary. Said operative steps are automatically performed, as better described hereafter. As better seen in FIG. 2, the self-propelling truck 5 can move in both directions to the left hand and right hand side with respect to the entrance door 3 such that the two rooms of the hold at either side of the entrance are fully stuffed.

In FIGS. 3, 4 and 5 the self-propelling truck according to the invention is shown in detail. It is comprised of a frame 8 carrying two idle wheels 9 and two drive wheels 10 actuated by an electrical motor 11 through a chain gearing 12 provided with reduction gear 13. Wheels 9 and 10 allow the truck to slide along the bottom 13 of the hold (FIG. 5) by rectilinear displacement guided by the shoe 14 integral with frame 8 and received in the longitudinal guide 15 already mounted on the aircraft hold and used for the engagement of the nets holding the luggages.

Mounted at either side of the truck is a roller 16 and 17, respectively, around which a belt 18 is wound. Such belt is arranged to move in a perpendicular direction to said longitudinal guide rail 15. Roller 16 is idle mounted on supports 19 provided with screwed sleeve 20 to adjust the tension of belt 18, while roller 17 is driven by a motor 21 provided with a reduction gear 22 through a chain gearing 23. Pivoted on the shaft of the driving roller 17 is a pair of lever arms 24 connected by a handle 25. The latter performs the dual function of handle for manually transporting the truck upon its initial introduction into the hold or its removal at the end of the operations, and of control switch 26 controlling the rotation of belt 18.

As shown in FIG. 5, handle 25 can assume two positions: a first position indicated in solid lines, wherein belt 18 is stationary, and a second position indicated in phantom, wherein one of the lever arms 24 acts on switch 26 of FIG. 3 which controls motor 21.

Mounted at either end of the truck are bumpers 27 acting on corresponding end switches 28 operatively connected to motor 11 controlling the slide displacement of the truck in both directions. The truck is supplied by an outer power source 29 (FIG. 6) through a power cable which is supplied by a reel 30 and is connected to a rotary switch 31 (FIG. 3) which can rotate in the directions indicated by arrows according to the position (right hand side, central or left hand side position) of the truck with respect to the belt elevator, as better described hereafter. All operative steps are controlled and programmed by an electronic card 32 mounted on supports 33.

In the operation, in case of a loading step, the belt elevator 4 is approached to the aircraft as shown in FIG. 2, whereupon truck 5 is placed into the aircraft hold and belt 18 of the truck is operated. As soon as a luggage 6 is transferred from elevator 4 to belt 18 of the truck, said belt is stopped when the luggage contacts and lets down handle 25. Belt elevator 4 is stopped too. Afterwards motor 11 is activated and the truck moves to the end of the hold in the right or left direction with respect to the aircraft hold door according to the actuation of the respective control relay. When the truck carrying a luggage reaches the operator, bumper 27 contacts the latter and causes the truck to stop. The operator takes up the luggage and stows it into the rack. The take up of the luggage causes the handle 25 to return in the upper position so that the empty truck is returned to the door. As soon as the truck is aligned with belt elevator 4 the rotary switch 31 of FIG. 3 causes the belt elevator to be actuated so that another luggage is transferred to the truck. This cycle is repeated until the loading opeation is completed.

As far as the unloading operation is concerned, the described cycle is carried out in the reverse direction; an empty truck is moving towards the operator putting luggages down on the truck, the luggages being then transferred to the belt elevator and then to the ground.

Figure 6:
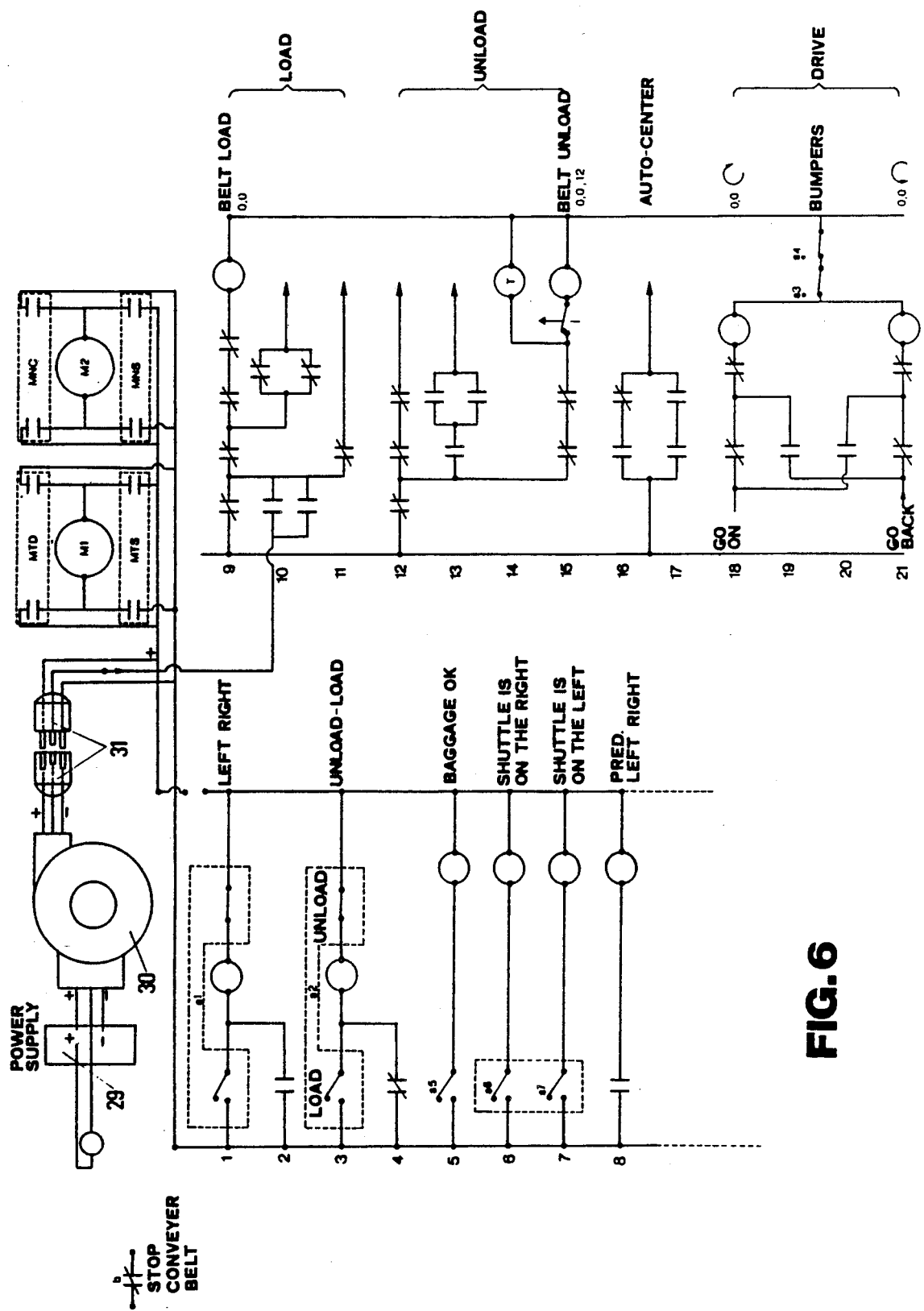
FIG. 6 shows the general electrical diagram illustrating the operative circuitry of the device.

All above mentioned operating cycles are shown in the diagram of FIG. 6 wherein components S1 and S2 relate to manually operated controls, and namely a switch S1 to select the room of the hold to be loaded (i.e. right hand or left hand side of the hold) and a second switch S2 to select a loading or unloading operation.

(A) Loading operation.

When S2 is in the "loading" position, lines 4, 9 and 12 of the diagram are actuated. Truck 5 is in the control position, belt 18 moves pursuant to belt elevator 4 so that a luggage is transferred to the truck and moves thereon up to its contacting handle 25. At this point steps are evolving as already described. In the diagram of FIG. 6 references M1 and M2 indicate motors 11 and 21 of the truck, while references MTD and MTS indicate the relays which control the right or left direction of displacement of the truck. References MNC and MNS indicate in turn the relays which control the direction of rotation of belt 18 of the truck according to the loading or unloading operation of a luggage.

(B) Unloading operation.

Truck 5 without load moves in the right or left direction according to the position of control switch S2. The truck stops when it contacts the operator and returns back after having received the luggage which lets down handle 25. The return movement is interrupted only when the rotary switch (S6, S7 or 31 of FIG. 3) is in the central position (i.e. power cable is aligned with rotary switch) whereupon belt 18 of the truck is activated for a few seconds by a timer T in a direction towards belt elevator 4 which rotates continuosly during the unloading operation.

In case the truck overcomes the alignment area with the belt elevator due to inertia, lines 16 and 17 actuate a self-centering means providing for the right positioning of the truck.

From what above the advantages achieved by the device according to the invention are self-evident, among which the independence of the conventional belt elevator from the truck sliding within the aircraft hold should be mentioned, said truck being connected to said belt elevator only by a multiple power cable which can be wound around or unwound from a reel (or by a hose in case of pneumatic system) which is used for supplying the truck without any mechanical connection. This eliminates any casual damage of the loading door, the inlet opening and the aircraft hold as the truck besides being of small size and light weight, utilizes a sliding guide already provided in the aircraft hold.

The present invention has been illustrated and described according to a preferred embodiment. It is understood that structural modification can be made without departing from the scope of this invention.

What is claimed is:

1. A portable aircraft luggage loading and unloading shuttle comprising a truck having drive means to cause said truck to shuttle along a predetermined line of direction from a first position to a second position within the luggage hold of an aircraft, an endless belt conveyor mounted and arranged to rotate in a direction that is perpendicular to said predetermined line of direction of said shuttle, conveyor switch means for automatically starting, stopping, and changing the direction of said conveyor when in said first position in response to a signal as to whether the conveyor is to be loaded or unloaded, switch means controlling said drive means having unloading and loading modes and sensing means for sensing said first and second positions to control said switch means such that when in the loading mode, causes said shuttle truck to move from said first position when loaded with luggage and to stop at said second position until it is unloaded and then to return it to said first position, and when in said unloading mode to move the shuttle truck unloaded from said first position to said second position and upon receiving a load of luggage to return to said first position at which time its conveyor is activated to discharge the luggage.

2. A shuttle truck according to claim 1 in combination with a separate continuous belt elevator which has a belt drive means to move luggage placed thereupon, said elevator being oriented perpendicular to said predetermined line of direction of said shuttle truck, said belt elevator having a discharge end arranged to be positioned in the doorway of an aircraft hold and to deliver to and receive luggage from said truck at said first position, elevator belt control means to stop, start, and change the direction of said elevator belt, and interconnect control means between said elevator belt control means and said conveyor switch means and shuttle drive switch means to cause said elevator belt to move toward said first position when said switch means is in the loading mode and said shuttle is receiving luggage in said first position and to cease moving when said shuttle moves to said second position and when said shuttle switch means is in the unloading mode to operate continuously and move luggage away from said first position.

3. A luggage loading device for moving luggage from the discharge end of a conventional belt elevator that is positioned within a doorway of an aircraft luggage hold comprising a portable aircraft luggage loading and unloading shuttle comprising a truck having drive means to cause said truck to shuttle along a predetermined line of direction from a first position at said doorway to a second position within the luggage hold of an aircraft, an endless belt conveyor mounted and arranged to rotate in a direction that is perpendicular to said predetermined line of direction of said shuttle, conveyor switch means for automatically starting, stopping, and changing the direction of said conveyor when in said first position in response to a signal as to whether the conveyor is to be loaded or unloaded, switch means controlling said drive means having unloading and loading modes and sensing means for sensing said first and second positions to control said switch means such that when in the loading mode, causes said shuttle truck to move from said first position when loaded with luggage and to stop at said second position until it is unloaded and then to return it to said first position, and when in said unloading mode to move the shuttle truck unloaded from said first position to said second position and upon receiving a load of luggage to return to said first position at which time its conveyor is activated to discharge the luggage.

4. The device of claim 3 in which the drive means of said movable truck is actuated by motors supplied with power by an outer power source, a belt elevator control means operatively connected to said shuttle truck and to said belt elevator to cause the belt elevator to stop after said shuttle truck is fully loaded and to start said truck again after said truck has been emptied of luggage and upon starting to return the truck to said starting position aligned with the belt elevator.

5. The device of claims 4 where said drive means has a manually operated switch for causing a control circuit to operate when in one position to receive luggage from one side and in a second position to receive luggage from the opposite side of said shuttle truck.

6. The device of claim 3 having a position sensing switch means in said control circuit that is arranged to determine when the shuttle truck is properly aligned with the conventional belt cargo elevator and to stop said truck when such aligned position has been effected.

7. The device of claim 3 where said drive means has a manually operated switch for causing a control circuit to operate when in one position to receive luggage from one side and in a second position to receive luggage from the opposite side of said shuttle truck.

* * * * *